(12) United States Patent
Holroyd et al.

(10) Patent No.: US 8,606,114 B2
(45) Date of Patent: Dec. 10, 2013

(54) ALIGNMENT OF A DATA SIGNAL TO AN ALIGNMENT SIGNAL

(75) Inventors: Amyas Daniel Holroyd, Paington (GB); Anthony George Foster, Paington (GB); Robert Griffin, Towcester (GB)

(73) Assignee: Oclaro Technology Limited, Northamptonshire (GB)

( * ) Notice: Subject to any disclaimer, the term of this patent is extended or adjusted under 35 U.S.C. 154(b) by 218 days.

(21) Appl. No.: 13/109,785

(22) Filed: May 17, 2011

(65) Prior Publication Data

US 2012/0294622 A1 Nov. 22, 2012

(51) Int. Cl.
*H04B 10/04* (2011.01)
*H04B 10/12* (2011.01)
*G02F 1/01* (2006.01)

(52) U.S. Cl.
USPC .......................................... 398/192; 359/279

(58) Field of Classification Search
USPC .......................................................... 398/192
See application file for complete search history.

(56) References Cited

U.S. PATENT DOCUMENTS

| 7,546,041 | B2 | 6/2009 | Griffin | |
|---|---|---|---|---|
| 7,986,885 | B2* | 7/2011 | Mamyshev | 398/188 |
| 2006/0088321 | A1 | 4/2006 | Cheung et al. | |
| 2006/0127103 | A1 | 6/2006 | Mazurczyk et al. | |
| 2006/0227401 | A1* | 10/2006 | Webb et al. | 359/276 |
| 2008/0187324 | A1 | 8/2008 | Akiyama et al. | |
| 2009/0086303 | A1 | 4/2009 | Ide et al. | |
| 2009/0141333 | A1* | 6/2009 | Tsunoda et al. | 359/279 |
| 2009/0269080 | A1 | 10/2009 | Akiyam et al. | |
| 2010/0128804 | A1* | 5/2010 | Shiran | 375/259 |
| 2012/0250793 | A1* | 10/2012 | Khatana et al. | 375/308 |

FOREIGN PATENT DOCUMENTS

| EP | 1 727 303 A2 | 11/2006 |
|---|---|---|
| EP | 1 764 935 A2 | 3/2007 |
| WO | WO 2004/005972 A2 | 1/2004 |

OTHER PUBLICATIONS

PCT/EP2012/059208 International Search Report (Aug. 27, 2012).
Patent Cooperation Treaty, Written Opinion of the International Searching Authority, International Patent Application No. PCT/EP2012/059208, Aug. 27, 2012, 9 pages.

\* cited by examiner

*Primary Examiner* — Leslie Pascal
*Assistant Examiner* — Casey Kretzer
(74) *Attorney, Agent, or Firm* — Fenwick & West LLP (57) ABSTRACT

The present invention provides a method and apparatus for phase aligning two optical signals within an optical transmitter to each other (and, in some embodiments, to a pulse carved optical signal) using integrated complimentary taps and a dither signal. The phase of a first signal may be intentionally offset relative to the phase of a second signal. Based on the offset, a correction factor may be calculated. The correction factor may be used to shift the phase of the first signal and/or the second signal in order to generally align the signals. This procedure may be automatically performed in a feedback loop to cause the signals to come into alignment and maintain the alignment of the signals during operation of the transmitter.

34 Claims, 8 Drawing Sheets

ALIGNMENT OF A DATA SIGNAL TO AN ALIGNMENT SIGNAL

BACKGROUND

This invention generally relates to optical communications, and in particular to a method and system for aligning data signals transmitted on an optical carrier medium.

The backbone of point-to-point information transmission networks is a system of optically amplified dense wavelength division multiplex (DWDM) optical links. DWDM optical fiber transmission systems operating at channel rates of 40 Gb/s and higher are highly desirable because they potentially have greater fiber capacity and also have lower cost per transmitted bit compared to lower channel rate systems.

The modulation format of 40 Gb/s DWDM transmission systems is typically chosen to have high Optical Signal-to-Noise Ratio (OSNR) sensitivity. High OSNR sensitivity means that a low OSNR is sufficient to maintain a desired bit error ratio (BER) of the transmission or, equivalently, that the system is able to operate at a desired BER even in the presence of a high level of optical noise. In addition, modulation formats of 40 Gb/s DWDM transmission systems are typically chosen to be tolerant to optical filtering because existing systems sometimes include optical multiplexers and demultiplexers for 50 GHz channels spacing that limit the bandwidth. Also, existing systems sometimes include cascaded optical add-drop multiplexers.

Accordingly, Differential Phased Shift Keying (DPSK) has been considered for 40 Gb/s DWDM transmission systems, in part because DPSK transmission systems have excellent OSNR sensitivity. In a DPSK system, data is encoded onto a carrier wave by shifting the phase of the carrier wave. The amount of the phase shift may be selected based on the amount of data to be encoded with each phase shift. For example, in Differential Binary Phase Shift Keying (DBPSK), the phase of the signal may be shifted in increments of 180° (i.e., by $\pi$ radians) in order to encode a single bit of data ("1" or "0") with each phase shift. In Differential Quadrature Phase Shift Keying (DQPSK), the phase of the signal may be shifted in increments of 90° (i.e., by $\pi/2$ radians) in order to encode two bits of data (e.g., "11" or "01") with each phase shift.

The number of possible phase shifts is typically referred to as the number of "constellation points" of a modulation format. For example, DBPSK has two constellation points, and DQPSK has four constellation points. Modulation formats using a different number of constellation points (e.g., "m" constellation points) are also known, and are referred to generically as DmPSK formats.

If both the phase of the signal and the amplitude of the signal are used to encode the signal with the data, then the modulation format is called QAM (quadrature amplitude modulation) or m-QAM, where m is the number of constellation points.

A shift in the phase of the signal is referred to as transmitting a "symbol," and the rate at which each symbol is transmitted is referred to as the "symbol rate." As noted above, multiple bits of data may be encoded with each symbol. The rate at which bits are transmitted is referred to as the "bit rate." Thus, the symbol rate in a DQPSK system is half the bit rate. For example, a DBPSK system and a DQPSK each transmitting at the same symbol rate would evidence different bit rates—the DQPSK system would have a bit rate that is twice the bit rate of the DBPSK system.

Accordingly, a 43 Gb/s data rate in a DQPSK system corresponds to 21.5 Giga symbols per second. Thus, DQPSK transmission systems have a narrower spectral bandwidth, greater chromatic dispersion tolerance and greater tolerance with respect to polarization mode dispersion (PMD) compared to traditional formats and compared to DBPSK.

DBPSK and DQPSK can be of the non-return-to-zero (NRZ)-type or, if a return-to zero (RZ) pulse carver is added to the transmitter, may be of the RZ-type.

Generally, a DmPSK signal may embody one or more data signals. For example, two or more modulators may each receive an electrical signal representing data digitally and electrically encoded as individual bits. The modulators may modulate an optical carrier to encode each data signal, and the resultant outputs may combine to encode multiple data streams onto a DmPSK optical signal.

If multiple electrical data signals are encoded onto an optical carrier, the electrical signals need to be aligned with each other. This is because the signals are eventually added together to form the optical signal. If the electrical signals are aligned to each other, then the full range of the optical amplitude containing the encoded data in its phase is used to encode the transmitted signal. However, if the electrical data signals are not aligned to each other, then the peaks of the data signals will not line up, and as a result the phases of each optical signal are not added correctly to give the correct transmitted phase.

For example, when two data signals are both at a peak (e.g., approximately 100% power, although 100% power is not required) and are added together, the result is that the combined output optical signal is at a maximum optical power. When two data signals are both misaligned, then there is a reduction in transmitted power.

However, if the electrical data signals are not properly aligned in time, then peaks of the signals do not properly line up. For example, consider what occurs if the first data signal and the second data signal are both at a peak, but are not properly aligned so that the second data signal reaches the peak slightly after the first data signal. In this case, the first data signal may be at a peak (100% power) when the data is encoded onto the optical carrier, while the second data signal may not have yet arrived at the peak (e.g., the second data signal may be at 80% power but approaching 100%). In this situation, the output optical signal may be at only 90% power.

As a result, the multiple signals need to be aligned to each other at the transmitter so that the output power of the optical signal is properly utilized and that the phase of each optical signal is correctly added, and so that the resulting signal can be properly interpreted at the receiver. Conventionally, signal alignment is done by manually reviewing a representation of a first signal and a second signal with an oscilloscope, and manually establishing static phase adjustment values that allow the signals to be aligned. The phase adjustment values are typically used for the life of the transmitter unless they are manually changed.

Problematically, manually establishing static phase adjustment values requires significant amounts of time and is an imprecise procedure. Further, the static phase adjustment values need to be recalculated if changes are made to the transmitter, which may necessitate taking the transmitter offline while the phase alignments are recalibrated. That is, because the values are not dynamic, they cannot adapt to changes in the system over time. This can cause issues because correct phase alignment cannot be guaranteed over the life of a signal and at different bit rates—if errors are present in the adjustment values due to a change in a characteristic of the signal or transmission line, or due to improper establishment of the adjustment values, the error cannot be corrected without manually recalculating and reconfiguring the static phase adjustment values.

SUMMARY OF THE INVENTION

The present invention provides a method and apparatus for phase aligning two signals within a transmitter to each other (and, in some embodiments, to a pulse carved optical signal) using integrated complimentary taps and a dither signal. The phase of a first signal may be intentionally offset relative to the phase of a second signal. Based on the offset, a correction factor may be calculated. The correction factor may be used to shift the phase of the first signal and/or the second signal in order to generally align the signals. This procedure may be automatically performed in a feedback loop to cause the signals to come into alignment and maintain the alignment of the signals during operation of the transmitter.

In exemplary embodiments of the present invention, feedback from a transmitter is used to align two or more signals in an optical network. The transmitter may include one or more modulators for generating one or more data signals including a first data signal. The transmitter may further include an alignment signal generator for generating an alignment signal. The alignment signal may be, for example, a pulse carved signal provided by a pulse carver or a second data signal.

The first data signal may be received at a monitor or tap integrated into the modulator that generates the first data signal. The modulator may include a first arm for providing a primary signal and a second arm for providing a complimentary signal. For example, the modulator may be an interferometer such as a Mach Zender interferometer. The monitor or tap may be integrated into the second arm to receive the complimentary signal.

One or more analysis points along the first data signal may be selected and used to determine a correction factor. The correction factor may be representative of a difference in phase between the first data signal and the alignment signal at the analysis point.

The correction factor may be digitally determined by comparing the response of the complimentary arm of the interferometer generating the first data signal after shifting the phase of the first data signal. For example, a first response at first point in time may be determined, and a second response at a second point in time may be determined. A mathematical operation, such as subtracting the first and second responses or taking a derivative of the slope of the responses, may be performed to determine an error value. The error value may be determined to be less as the phase of the first data signal approaches proper alignment with the alignment signal. The correction factor may be determined based on the error value.

In one embodiment, the error value may be determined by applying dither to the first data signal to cause an offset in the phase of the first data signal.

The error value may include a magnitude and a sign or direction. An amount of phase adjustment to be applied to the first data signal may be determined based on the magnitude of the error value, and the direction of the phase adjustment may be determined based on the sign of the error value. The correction factor may be determined based on the amount and direction of the phase adjustment to the first data signal.

The correction factor may also be determined by calculating a difference in phase at the different analysis points. The difference in phase may be calculated digitally so that the difference in phase is representative of a step change at the analysis point, or may be calculated in an analog manner so that the difference in phase is representative of a progressive change at the analysis point.

Based on the determined correction factor, the phase of the first data signal may be adjusted with respect to a phase of the alignment signal to converge the phase of the first data signal towards a phase of the alignment signal. In this way, the signals may be generally brought into an aligned state. The aligned state maybe, for example, a state in which a local minimum of the response of the complimentary tap of the interferometer generating the first data signal is aligned with a local minimum of the complimentary tap of the interferometer generating the second data signal and/or the alignment signal.

The above-described procedure may be employed in a feedback loop. That is, the steps for aligning the first data signal to the alignment signal may be repeated until the first data signal is at least generally aligned with the alignment signal.

In some embodiments, a second data signal may be aligned to the alignment signal in the same manner as described above. If multiple data signals are aligned to the alignment signal, the above-described steps may be repeated in varying combinations until the first and second data signals are aligned to the alignment signal. For example, the first data signal may be brought into alignment with the alignment signal before processing begins on the second data signal. Alternatively, the signals may be incrementally aligned together so that the first signal is partially aligned, the second signal is partially aligned, the first signal is further partially aligned, etc.

Furthermore, if multiple data signals are aligned to an alignment signal, the analysis points in the first and second data signals may be selected so as to substantially correspond to the same point in time. Still further, the analysis point may relate to an alignment point in the alignment signal, and respective analysis points in the first and/or second data signals may be selected to correspond to the alignment point in the alignment signal.

When the first and second signals are aligned, the optical communications network may transmit a Differential Quadrature Phase Shift Key (DQPSK) signal that includes the aligned first data signal and second data signal.

The invention may be embodied in a signal alignment apparatus for use in an optical communications network to align a first data signal with an alignment signal using feedback from a transmitter. The apparatus may be adapted to carry out the procedures described above.

In the apparatus, an alignment signal generator may generate an alignment signal, and a first data signal generator may generate a first data signal. The first data signal generator may include a first arm for providing a primary signal and a second arm for providing a complimentary signal. A monitor for receiving the first data signal may be integrated into the second arm of the first data signal generator to receive the complimentary signal, which may be provided in the digital domain. Further data signal generators may similarly be provided to generate a plurality of data signals which may be transmitted in an aligned DQPSK optical signal.

The apparatus may further include an alignment controller for receiving at least a portion of the alignment signal and at least a portion of the first data signal. The alignment controller may generate a correction factor for adjusting a phase of the first data signal. The alignment controller may include an alignment point processing module for selecting an alignment point in the alignment signal and determining a first signal point in the first data signal that corresponds to the alignment point and an error value determination module for determining a first signal error value in the first data signal at the first signal point.

The apparatus may further include a phase adjustor for applying a phase adjustment to the first data signal to adjust a phase of the first data signal with respect to a phase of the alignment signal based on the determined first signal error value. The phase adjustor may adjust the direction of a phase of the first data signal based on a sign of the first signal error value.

If multiple data signals are to be aligned, the alignment controller may further receive at least a portion of the additional data signals and generate a correction factor for adjusting a phase of the additional data signals. The alignment point processing module may determine a further signal points in the additional data signals that each correspond to the alignment point, and further error value determination modules may be provided for determining further signal error values in the additional data signals at the further signal points. Additional phase adjustors may be provided for applying phase adjustments to the additional data signals based on the determined signal error values. In this way, the additional data signals and the first data signal may converge towards an aligned state.

The apparatus may further include one or more analog-to-digital converters (ADC) for converting the output of at least one of the first data signal generator and the second data signal generator to a corresponding digital input signal. The digital input signal may be introduced to the alignment point processing module. Additionally, the apparatus may include one or more digital-to-analog converters (DAC) for converting the output of the alignment signal generator into a digital alignment input signal that is introduced to at least one of the first and second error value determination modules.

The apparatus may further include an output for transmitting a Differential Quadrature Phase Shift Key (DQPSK) signal comprising the first data signal and the second data signal.

DESCRIPTION OF THE DRAWINGS

In the Figures, the same reference numbers are used to refer to the same elements throughout.

DETAILED DESCRIPTION

The present invention provides techniques for automatically aligning two or more signals in an optical network, such as an data signal and an alignment signal generated by a pulse carver. The present invention advantageously leverages feedback provided by the transmitter to adjust the phase of the signals with respect to each other until the signals are aligned.

The control loop may be applied during operation of the transmitter to align the signals. In this way, changes in electrical phase of the signal may be compensated for by the control loop. Further, different bit rates can be used in the signal without the need for separate static calibration settings, and accurate phase alignment can be achieved quickly without requiring system performance measurements.

The invention is described in detail below with respect to the accompanying Figures. It should be noted that, although the present invention may be discussed with reference to specific examples, the present invention is not so limited. For example, the present invention will be discussed with respect to differential systems such as DQPSK systems. However, the concepts described herein are equally applicable to coherent systems.

Figure 1:
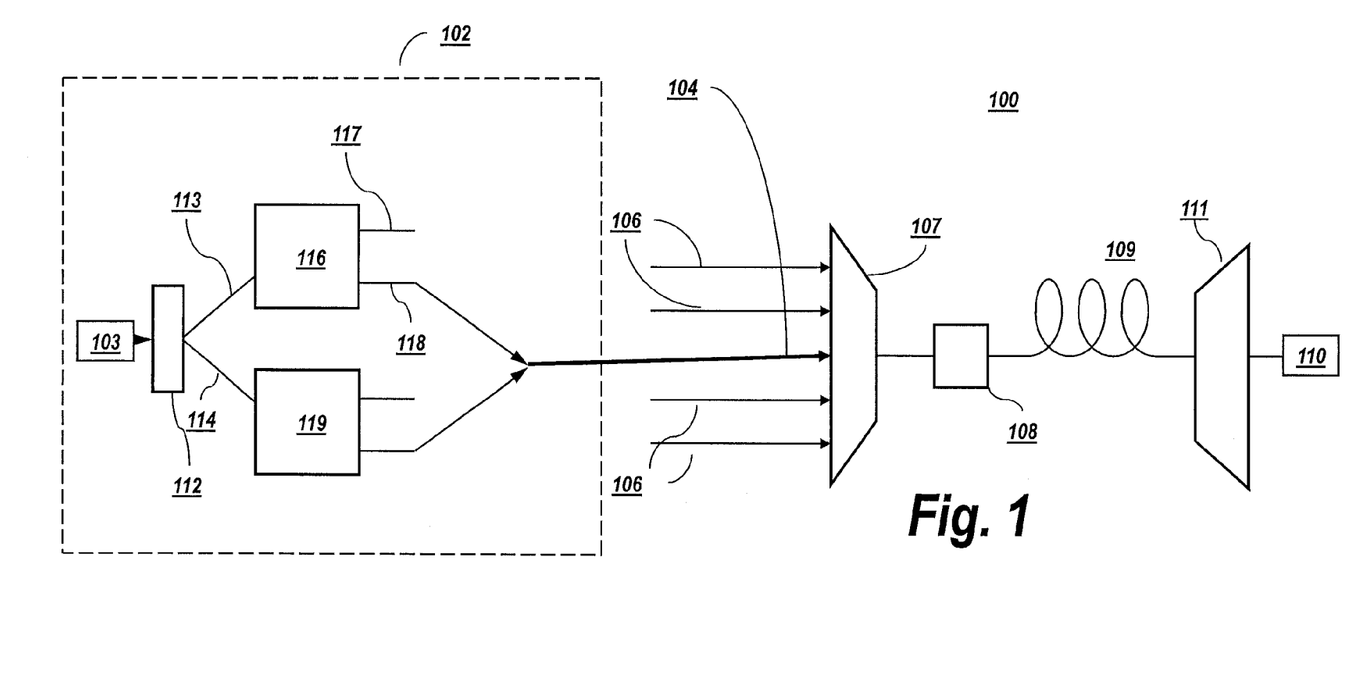
FIG. 1 is a schematic block diagram of an optical network 100 according to the teachings of the present invention.

FIG. 1 is a schematic block diagram describing an example of an optical communications network 100 for transmitting, among other things, a DQPSK optical signal. In the optical communications network 100, a transmitter 102 may generate a DQPSK optical signal 104.

The DQPSK optical signal 104 may be combined with one or more on-off-keyed (OOK) signals 106 at a multiplexer 107. For example, the signals may be multiplexed using wavelength division multiplexing (WDM), and two neighboring signals may have relatively similar wavelengths. By multiplexing the signals 104, 106 together and/or filtering the signals using one or more optical filters 108, more information can be carried over a transmission line 109. The filters 108 may include, for example, multiplexers, demultiplexers, optical interleavers, optical add/drop filters, and wavelength-selective switches. The filters 108 may spectrally narrow the signal passing therethrough.

The combined optical signal carried on the transmission line 109 may be received at a receiver 110 for demodulating the combined optical signal. Prior to the receiver 110, a demultiplexer 111 may receive a multiplexed signal. The demultiplexer 111 may select one of the signals, for example the DQPSK signal 104. The demultiplexer 111 may select the signal, for example, by isolating a particular wavelength carrying the DQPSK signal 104. Alternatively, the receiver 110 may include a demultiplexer 111 or selector for receiving an incoming modulated optical signal.

In order to transmit an optical signal in a PSK modulation format, a signal having a phase is needed. The phase is then adjusted to encode data onto the signal. In order to provide a base signal having a phase, the transmitter 102 includes a light source 103 and a pulse carver 112.

The light source 103 may be, for example, a light emitting diode (LED) or a laser, such as a continuous wave (CW) laser or distributed feedback laser (DFL).

A pulse carver 112 may accept a beam of light from the light source 103 and modulate the light to provide a series of light pulses. The pulse carver is responsible for improving the optical performance of the system. In one embodiment, the pulse carver 112 is an interferometer which manipulates the light from the light source 103 by optically modulating the light from the light source 103 in an on-off fashion. This may be done by flipping the phase by 180° in the interferometer. For example, the pulse carver 112 may be an interferometer that employs peak-to-peak phase flipping or peak-to-trough phase flipping to turn the light signal on an off successively.

The resulting signal increases in optical power (e.g., includes more photons) until the signal reaches a peak due to constructive interference between the arms of the interferometer/pulse carver 112. After the peak, the signal decreases due to destructive interference until the signal reaches a trough. Accordingly, a pulse is generated having a phase which can be manipulated by the modulators.

If multiple modulators are employed, the pulse carver 112 may include a splitter for splitting the pulse carved beam into multiple components. Alternatively, a separate splitter may be provided. For example, the pulse-carved output of the pulse carver 112 may be provided to a Y-branch, Y-coupler, or multi-mode interference (MMI) branch through a waveguide. The pulse-carved beam may be split into n paths, where n represents the number of modulators to which the pulse carved signal may be provided. Preferably, each of the n split paths is of equivalent optical power.

For example, the pulse carved signal may be split into two or more source beams 113, 114. The first source beam 113 is received at a first interferometer 116, and the second source beam 114 is received at a second interferometer 119.

DPSK/DQPSK transmitters use one or more optical modulators that apply phase modulation to the pulse carved signal. Optical modulators may be implemented as delay interferometers (DIs) or Mach Zehnder Interferometers (MZs) 116, 119 that split the optical signal into two parts, delay one part relative to the other by a differential delay $\Delta t$, and finally recombine the two parts to achieve constructive or destructive interference depending on the phase which is modulated onto the optical signal at the transmitter 102, as is well known in the art. In addition to this, the optical modulator can also be used as a phase switch.

The interferometers 116, 119 may be, for example, unbalanced Mach-Zehnder interferometers (MZI) or delay line interferometers (DLI) which receive one of the signal components (e.g., the first source beam 113) from the pulse carver 112. The interferometer 116 may be fabricated, for example, in gallium arsenide or lithium niobate or Indium Phosphide.

Figure 8A:
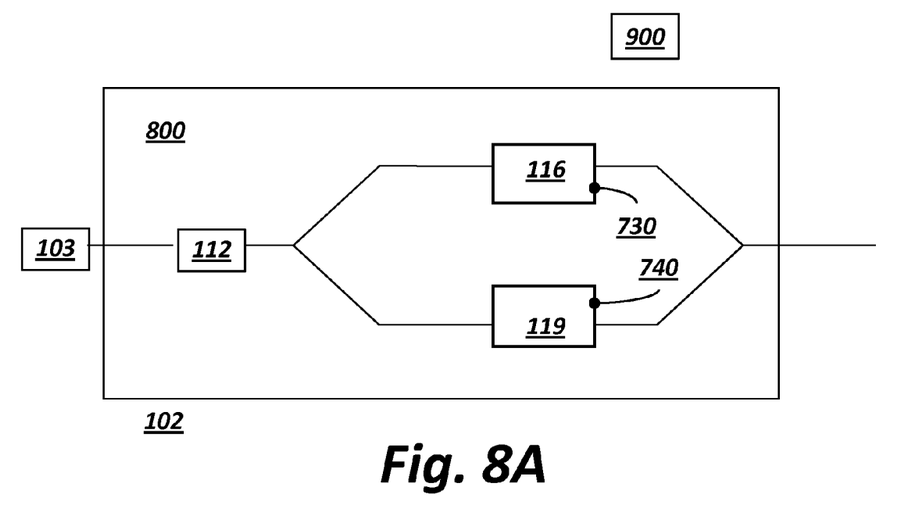
FIG. 8A depicts an exemplary integrated transmitter 102 for use with exemplary embodiments of the present invention.

The modulators may further include one or more electrical inputs for receiving one or more electrical input signals which encode data digitally as a succession of bits. The purpose of the modulators is to apply the electrical data to the modulator to modulate the optical carrier provided by the pulse carver 112, and provide one or more outputs that may be an optical representation of the data. For example, the modulators may each include a first arm that outputs a primary optically modulated output signal 118 and a second arm that outputs an inverted or complimentary optically modulated signal 117. One or more of these output signals are may be detected with a photodetector, which may consist (for example) of a high-speed detectors (see, e.g., FIG. 8).

In operation, the interferometers 116, 119 shift the phase of the incoming signals in order to encode data onto an optical carrier. For example, in a DQPSK system, the interferometers 116, 119 may shift the phase of the incoming signals relative to each other by $\pi/2$. To achieve such a shift, for example, the first interferometer 116 may shift the phase of the signal by $\pi/4$, and the second interferometer 119 may shift the phase of the signal by $-\pi/4$.

For example, each interferometer 116, 119 may be respectively set to impart a relative phase shift by the application of an appropriate voltage to electrodes on one of the arms of the interferometer 116, 119. The amount of the phase shift may be determined, for example, based on the modulation format. In the example of DQPSK, the relative phase shift 156 may be $\pi/4$ or $-\pi/4$. In the example of DPSK, the relative phase shift 156 may be $\pi$ or 0. A more detailed description of the interferometers and time delay can be found in U.S. patent application Ser. No. 10/451,464, entitled "Optical Communications," the contents of which are incorporated herein by reference.

Increasing the number of available phase shifts is one way to increase the number of constellations used to encode data on a signal to thereby encode more data using each symbol. Another way to increase the number of constellations is to employ polarization. Polarization refers to the orientation of the oscillation of a wave. By modifying the polarization, either by itself or in conjunction with employing other modulation formats such as DQPSK, more data can be encoded into a symbol. For example, a shift in phase may be used to encode two bits while a shift in polarization may be used to encode two additional bits. The combination of the phase shift and the polarization shift may therefore encode four bits of data. The present invention is equally applicable where the number of constellations are determined by the modulation format, the polarization of the light, or both.

As noted above, the interferometers 116, 119 may each generate a primary output 118 which represents the encoded data, and a complimentary output 117. The primary output 118 of each interferometer 116, 119 may be, for example, added together so that the resulting DQPSK modulated signal 104 represents multiple data signals. The complimentary output 117 may be used for signal alignment purposes as described in more detail herein.

An advantage of using the complimentary output 117 of the interferometers is that the complimentary output 117 is not typically used for other applications. Accordingly, it is not necessary to insert detectors into the path of the primary signal 118, which might weaken the primary signal 118 and/or introduce errors into the primary signal 118.

In some embodiments, the components of the transmitter 102 may be integrated onto a single chip or substrate. Advantageously, because the transmitter components may be provided integrally, monitor diodes/taps may be provided with the components to monitor, for example, the output signal 117 on the complimentary arm of the interferometer 116. In this way, the output of the interferometer can be easily used to align the data signals. Further, additional signal paths do not need to be provided to external taps, so signal alignment may occur more quickly and more accurately. The resulting system is also less expensive and easier to manufacture.

Figure 2:
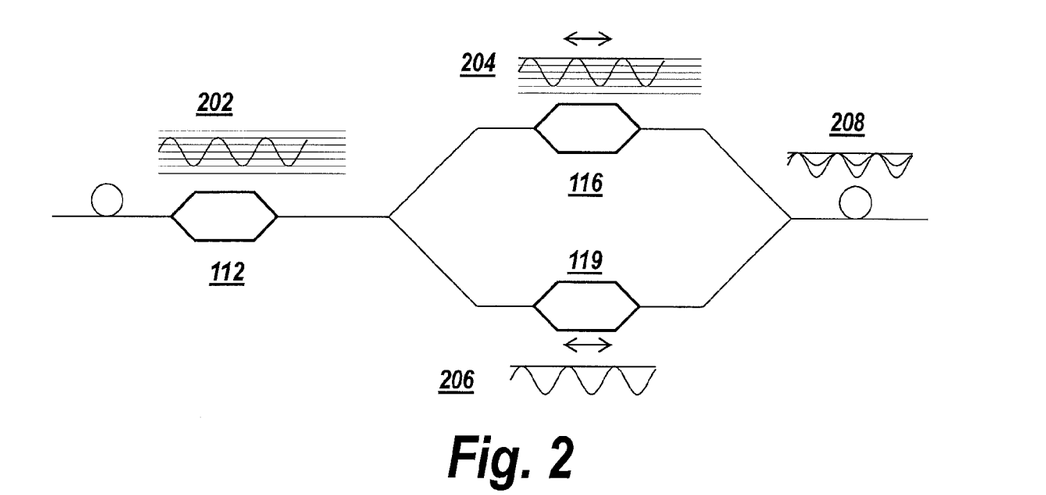
FIG. 2 depicts a portion of the transmitter 102 of FIG. 1 showing exemplary data signals to be aligned according to the teachings of the present invention.

Therefore, using the techniques described herein, the optical communications network 100 may efficiently transmit a Differential Quadrature Phase Shift Key (DQPSK) signal embodying the first data signal and the second data signal, which are aligned to each other. FIG. 2 depicts a portion of a transmitter 102 showing exemplary data signals to be aligned, as well as a more specific depiction of the pulse carver 112 and the optical modulators 116, 119. According to one embodiment, the pulse carver 112 and the optical modulators 116, 119 can be interferometers.

In the transmitter 102, the pulse carver 112 generates a pulse carved signal 202. The pulse carved signal 202 may be used as an alignment signal.

It should be noted that the pulse carver 112 may be provided before or after the interferometers 116, 119. For example, if the transmitter is used to align the data signal of the first interferometer 116 directly with the data from the second interferometer 119 (i.e., without initially referencing the signal from the pulse carver 112), then the pulse carver 112 may be provided after the first and second interferometers 116, 119.

Certain points in the data signals or alignment signal may be used to encode the symbols. The goal of signal alignment is to generally align the peaks of two or more data signals 204, 206 which encode the phase changes so that the data signals 204, 206 can be transmitted and properly interpreted together. The result should be an aligned combined signal 208 with the peaks and troughs (representing the phase transitions) of the data signals 204, 206 generally aligned to each other. If the phase transitions of the data signals 204, 206 are not aligned to each other in the combined data signal 208, then the phase data encoded into each optical peak will not be efficiently and correctly utilized.

Figure 3:
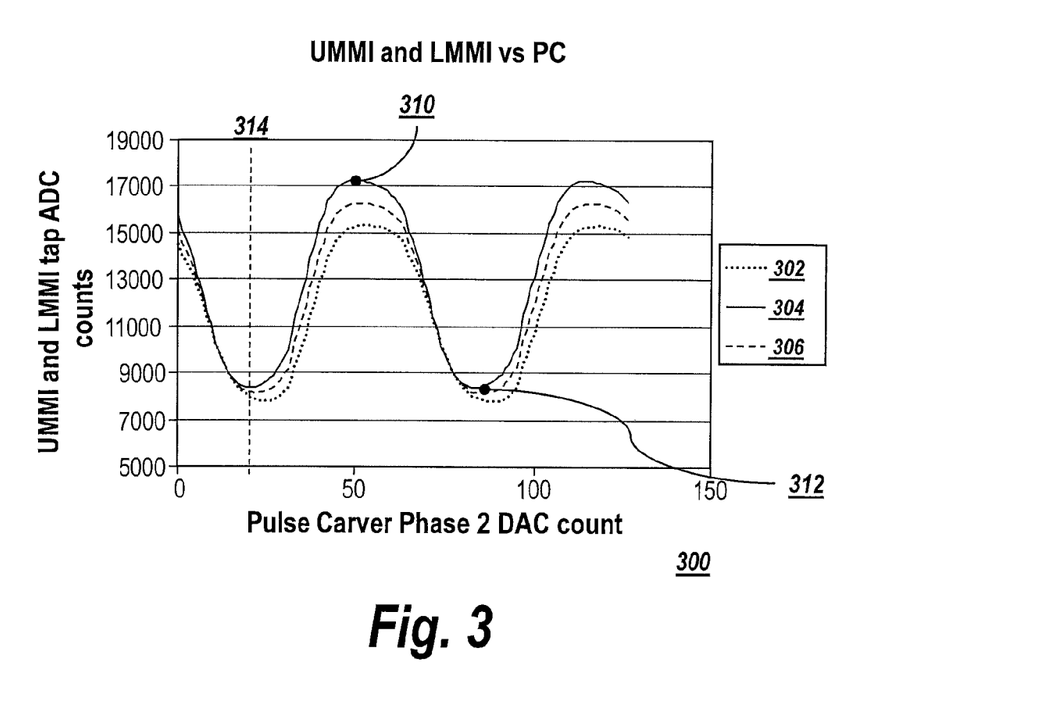
FIG. 3 is a graphical illustration showing a relationship between the respective unaligned phases of a first data signal 302 and a second data signal 304 with respect to a pulse carver based on the output of the complimentary taps related to the first data signal 302 and second data signal 304.

FIG. 3 is a graph 300 depicting the response of the complimentary tap monitors of the interferometers when the pulse carver has its phase alignment changed across a range with respect to the data signals. Trace 304 shows the response of the monitor from the top interferometer 116 complementary tap 117 and trace 302 shows the response of the monitor on the complementary tap on the interferometer 119. The line 306 represents the average of the traces 302, 304. The minimum (and maximum) of each trace can be seen to be misaligned. This response is used to by the control loop to align the data to the carver.

The x-axis of the graph 300 represents a change in phase of the pulse carver with respect to the data signals. The y-axis of the graph 300 represents the output of the complimentary taps of the first and second interferometers 116, 119 in the digital domain. As can be seen, the output of the complimentary taps of the interferometers 116, 119 includes a series of peaks 310 and troughs 312 used to provide the error signals.

However, the peaks 310 and troughs 312 of the trace 302 of the first complimentary tap output and the trace 304 of the second complimentary tap output are not properly aligned, as can be seen by comparing the value of the first trace 302 with the value of the second trace 304 at the time indicated by the line 314. At the line 314, the second trace 304 has just reached a trough 312; however, the first trace 302 will not reach a trough for several more pulse carver counts.

Figure 4:
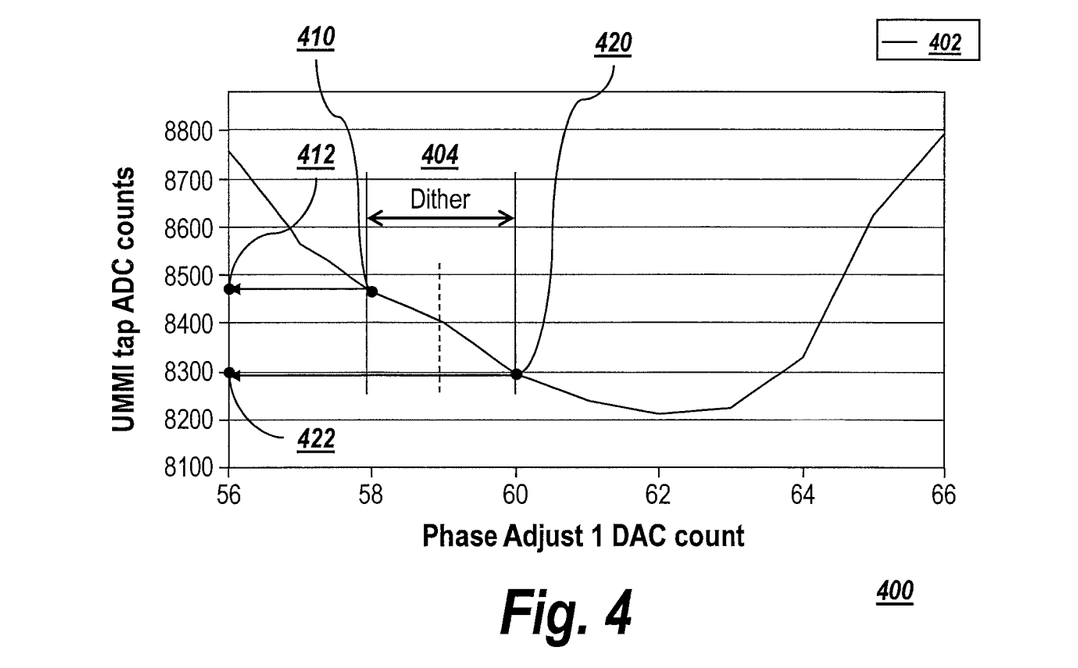
FIG. 4 graphically depicts exemplary analysis points and a procedure for applying dither to a signal according to the teachings of the present invention.

This indicates that the data signals corresponding to the complimentary tap output traces 302, 304 are not in proper alignment. It would therefore be desirable to align the first data signal and the second data signal so that the peaks 310 and troughs 312 of each complimentary tap output generally correspond to each other. For example, the phase of each signal might be shifted so that the traces 302, 304 of the complimentary outputs move towards the average 306 until they are generally aligned with each other. FIG. 4 is an annotated graph 400 that demonstrates a technique for aligning the signals by shifting the phase of a signal while applying dither 404 to the signal. FIG. 4 shows the response 402 of the complimentary tap of an interferometer as the phase of the signal generated by the interferometer is adjusted to be more/less in alignment with the pulse carved signal.

As used in FIG. 4, "dither" 404 represents an intentional offset applied to the phase of a data signal whose monitor response with respect to phase offset is trace 402 in order to shift the phase of the signal in one direction or the other. The effect of dithering the signal may be measured by observing the output response 402 of one or more arms of the interferometers 116, 119. For example, when the phase of a signal modulated by an interferometer 116 is in proper alignment with an alignment signal such as the pulse carved signal, the output power of the primary arm of the interferometer 116 is large, while the output power of the complimentary arm of the interferometer 116 is small. Thus, if the phase is shifted away from a desired or optimal phase, the output power as measured at the complimentary tap increases as shown in the increase in the power of trace 402. By shifting the phase so as to reduce or minimize the output power of the complimentary tap, a desired phase can be achieved.

In order to dither the signal, a first analysis point 410 may be identified, and a corresponding value 412 of the output of the complimentary tap may be established or measured. The corresponding value 412 may be, for example, an output power of a complimentary arm or an interferometer that generated the signal. In the example depicted in FIG. 4, the value 412 is about 8480 counts.

The phase of the data signal may then be shifted and a second analysis point 420 may be identified in the trace 402 of the complimentary arm tap. The second analysis point 420 may be identified, and a corresponding value 422 of the output of the complimentary tap may be determined at the second analysis point. In this case, the second value 422 is about 8290.

The first value 412 may be subtracted from the second value 422 in order to determine an error value. In this case, the error value is approximately −190. As can be seen from this example, the error value has both a magnitude (190) and a sign (negative). The magnitude of the error value may be used to determine an amount to adjust the phase of the signal that generated the complimentary output trace 402 in order to bring the signal into proper alignment with the pulse carved signal or other alignment signal. The sign of the error value may be used to determine the direction in which to shift the phase of the signal—in this case, a negative error value indicates that the phase should be increased so that the output trace 402 of the complimentary arm tap approaches the local minimum. As shown in the graph 400, the magnitude of the error value will increase if the phase of the optical signal is shifted to be further away from alignment with the pulse carved signal, and vice versa.

Those of ordinary skill in the art will readily recognize in light of the teachings herein that other methods to calculate the error value may be used. For example, an analysis point may be selected and a derivative of the response of the complimentary tap may be calculated at the analysis point. Based on the magnitude and direction of the derivative, a correction factor may be determined.

Figure 5:
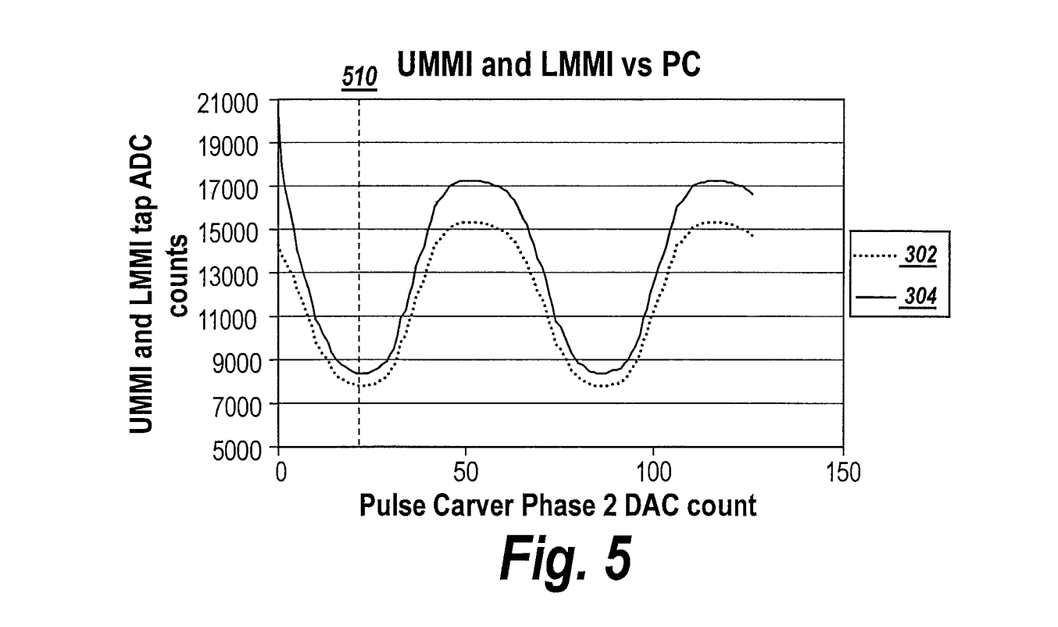
FIG. 5 is a graphical illustration showing a characteristic response of two electrically modulated data signals in proper alignment with respect to a pulse carver based on the output of the complimentary taps related to the first data signal 302 and second data signal 304.

As a result of applying dither to the phase of the data signal, and by analyzing the response of the monitored power trace 402 via the complimentary tap, the signal may be brought into alignment with the pulse carved signal. By applying this method iteratively or sequentially to multiple data signals, the data signals can be brought into alignment with both the pulse carver and each other. FIG. 5 is a graph the output trace of the complimentary taps of two signals that have been aligned according to an exemplary embodiment of the present invention.

As can be seen by comparing the output traces 302, 304 of the first signal and the second signal, the minimum values of each output trace are generally aligned. For example, at the time indicated by the line 510, the output responses 302, 304 of the complimentary taps associated with each data signal are at a trough.

Figure 6A:
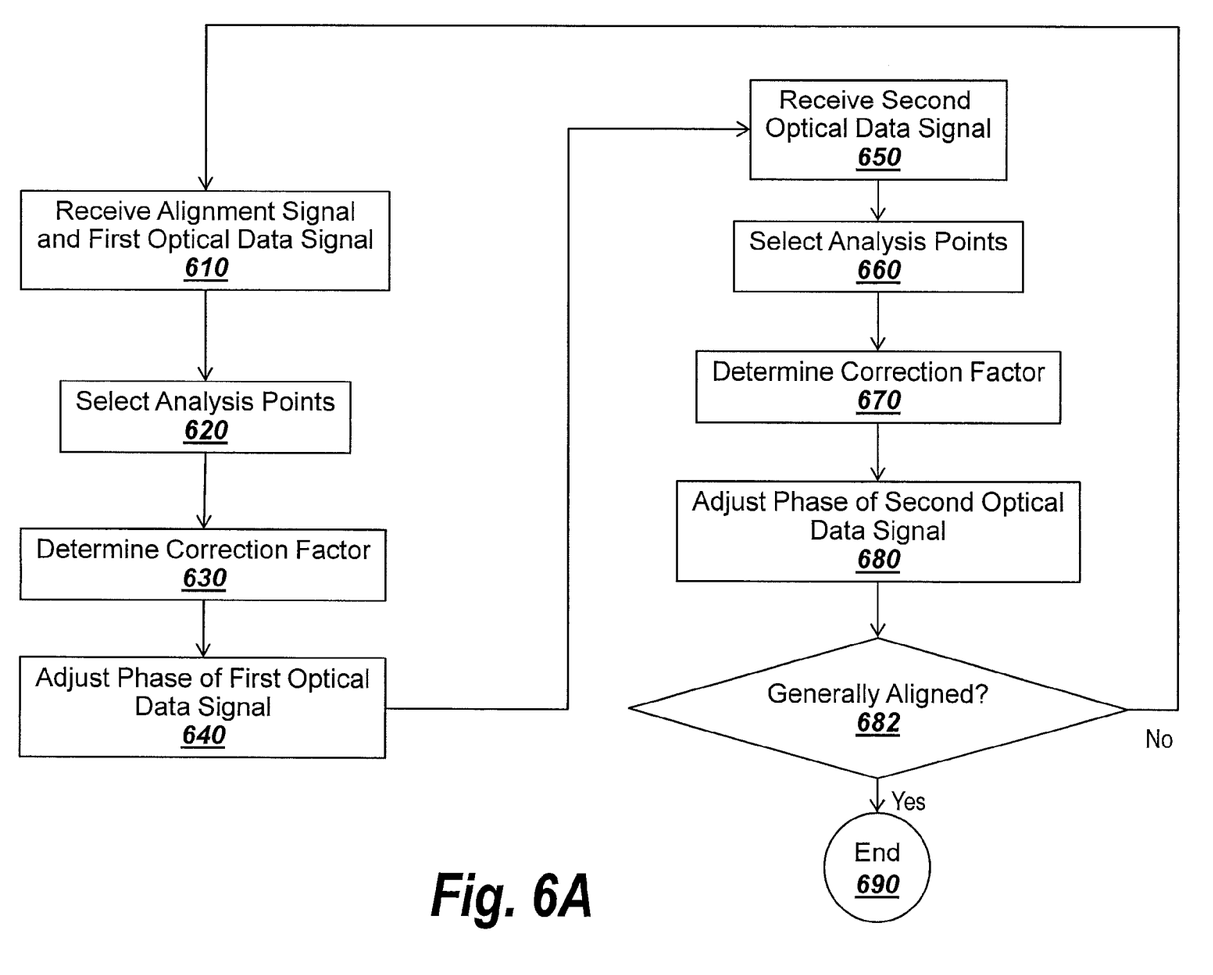
FIG. 6A is a schematic flowchart depiction describing a method for aligning data signals according to an exemplary embodiment of the present invention.
Figure 6B:
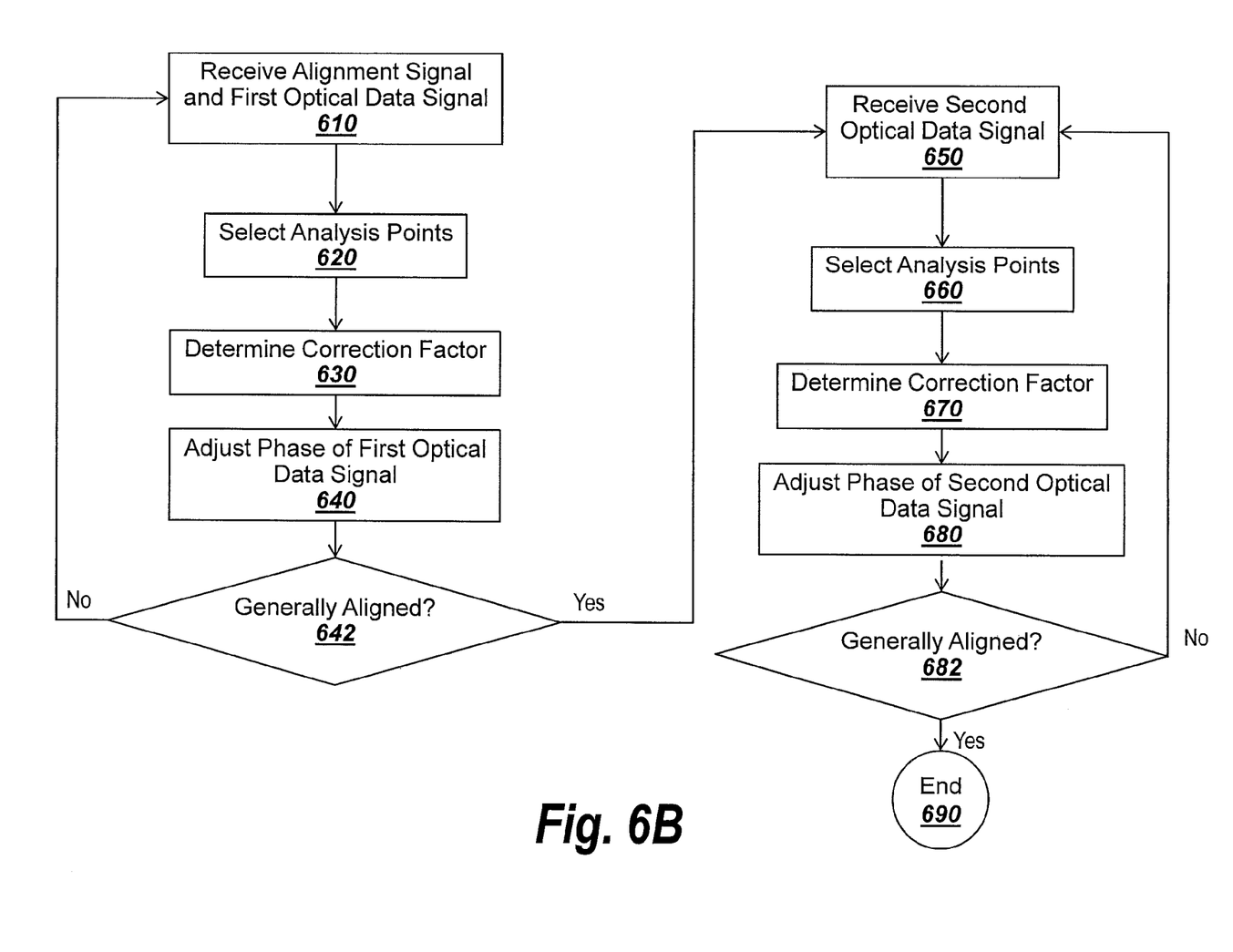
FIG. 6B is a schematic flowchart depiction describing an alternative method for aligning data signals according to an exemplary embodiment of the present invention.

A number of techniques may be employed to align the signals. Several such techniques are described with reference to FIGS. 6A and 6B. It should be noted at the outset that, although only two data signals are described in FIGS. 6A and 6B, the steps described in FIGS. 6A and 6B may be easily extended to address the alignment of any number of signals. Further, although FIGS. 6A and 6B depict the process as "ending" at step 690, the end represents only the time at which two or more signals have been initially brought into proper alignment. The process may be repeated as needed, e.g., throughout the life of an optical transmission, in order to maintain the alignment of the signals.

FIG. 6A is a flowchart describing a method for aligning data signals according to an exemplary embodiment of the present invention.

At step 610, an alignment signal and a first data signal may be received. The alignment signal may be, for example, a pulse-carved signal provided by a pulse carver and may be received at, for example, an interferometer or modulator which generates the first data signal. The first data signal may be a signal output by the interferometer or modulator and may be received at, for example, an alignment controller (see FIG. 9) via a monitor (see FIG. 8) or tap integrated into a complimentary arm of the interferometer or modulator (see FIG. 7). The first data signal may also be an electrical signal carrying data to be encoded by the interferometer. The first data signal (and any other data signals) may be encoded on any suitable medium, such as optically or electrically.

At step 620, one or more analysis points along the first data signal may be selected. The analysis points may be used to dither the first data signal. The analysis points may be selected by any means, including a random selection. The alignment points may be in the first signal or in another signal that gives rise to the first signal (as in the case of an electrically-encoded input signal that is modulated onto an optical carrier to generate an optical signal).

At step 630, a correction factor representative of a difference in phase between the first data signal and the alignment signal at the analysis point is determined. The correction factor may be determined by, for example, dithering the first data signal. This may involve determining a first response of the complimentary tap of the interferometer at a first point in time of the first data signal and determining a second response of the complimentary tap of the interferometer at a second point in time. The difference in responses may represent a difference in phase alignment between the data signal and the alignment signal. A mathematical operation, such as subtracting the first response from the second response or taking a derivative of the responses, may be performed to determine an error value. A correction factor may be determined based on the error value.

The correction factor may be determined in a digital or analog manner. If the difference in responses is determined digitally, the difference may represent a step change at the analysis point. If the difference in responses is determined in an analog manner, the difference in phase may be representative of a progressive change at the analysis point.

Preferably, the difference in responses is determined digitally. If the difference in responses is determined digitally, then the procedures described herein can be used to perform dynamic gain control using a processor. Accordingly, the gain control can be programmed into the apparatus (and subsequently modified) by updating the apparatus' firmware.

At step 640, the phase of the first data signal is adjusted with respect to a phase of the alignment signal based on the correction factor to converge the phase of the first data signal towards a phase of the alignment signal so as to generally align the signals. If an error value is determined at step 630, the error value may be associated with a magnitude and a sign. The magnitude of the error value may indicate an amount of phase adjustment to be applied to the first data signal (e.g., a greater error value indicates that the first data signal should be shifted a greater amount), while the sign of the error value may indicate the direction of the adjustment. The correction factor may be determined based on the direction and amount of the phase adjustment to be applied.

The phase may be adjusted, for example, by using a phase adjustor to apply a control voltage to a signal phase shifter related to a device that supplies an electrical signal to be modulated onto an optical carrier by an interferometer by an amount and in a direction determined by the correction factor.

At steps 650-680, the procedure described in steps 610-640 may be repeated for a second data signal. The second data signal may be aligned to the same alignment signal as was identified at step 610. The analysis point for the second data signal may be selected so as to substantially temporally correspond to the analysis point used in step 620 for the first data signal.

At step 682, it is determined whether the first data signal is aligned to the alignment signal and the second data signal is aligned to the alignment signal (or, alternatively, whether the first and second data signals are aligned to each other). If the answer at step 682 is "yes," then processing ends at step 690. If, on the other hand, the answer at step 682 is "no," then processing returns to step 610 and the procedure is repeated until the first and second data signals are brought into alignment.

FIG. 6B is a flowchart describing an alternative method for aligning data signals according to an exemplary embodiment of the present invention. As can be seen by comparing FIG. 6B to FIG. 6A, an additional query 642 is included after the phase of the first data signal is adjusted. The query 642 determines whether the first signal is generally aligned to the alignment signal. If the response to the query 642 is "no," then steps 610-640 may be repeated until the first signal is aligned to the alignment signal. When the response to the query 642 is "yes," processing may proceed to step 650.

Similarly, at step 682, it is determined whether the second signal is generally aligned with the alignment signal. If the answer at step 682 is "yes," then it is determined that the second signal is aligned to the alignment signal. Because the answer at step 642 was also "yes," it is known that the first and second signals are also aligned to each other. Accordingly, processing ends at step 690.

If, on the other hand, the answer at step 682 is "no," then processing returns to step 650 and steps 650-680 are repeated to align the second signal to the alignment signal.

Accordingly, the main difference between the procedures described in FIGS. 6A and 6B is that the procedure of FIG. 6A incrementally aligns the first signal and the second signal to the alignment signal (and hence to each other) by alternating between adjusting the phase of the first signal and the second signal. In contrast, in FIG. 6B the first signal is aligned to the alignment signal and then the second signal is aligned to the alignment signal.

Figure 7:
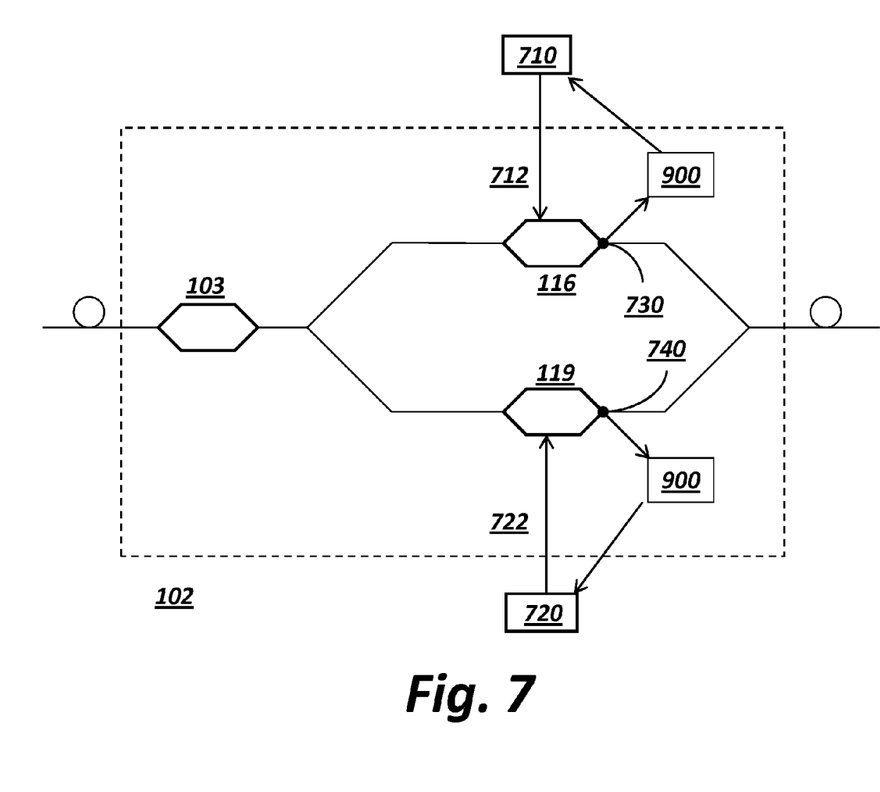
FIG. 7 depicts a portion of the transmitter 102 of FIG. 1 according to an exemplary embodiment of the present invention.

The procedures described in FIGS. 6A and 6B may be carried out in a suitably programmed apparatus. For example, FIG. 7 depicts a portion of a transmitter 102 for carrying out the techniques described herein.

In the transmitter 102, a pulse carver 103 provides a pulse carved signal to a first interferometer 116 and a second interferometer 119. The pulse carver 103 may serve as an alignment signal generator for generating an alignment signal (in this case, the pulse carved signal), which may be received at the first interferometer 116 and the second interferometer 119, which may serve as first and second data signal generators, respectively. For example, the first and second interferometers 116, 119 may be Mach-Zender (MZ) interferometers.

The first interferometer 116 includes a primary output which outputs a signal to be combined with the primary output of the second interferometer 119 into an aligned DQPSK optical signal. The first interferometer 116 further includes a monitor diode or tap 730 for monitoring the complimentary output of the interferometer 116. The monitor diode or tap 730 may be integrated onto the complimentary arm of the interferometer 116.

Figure 9:
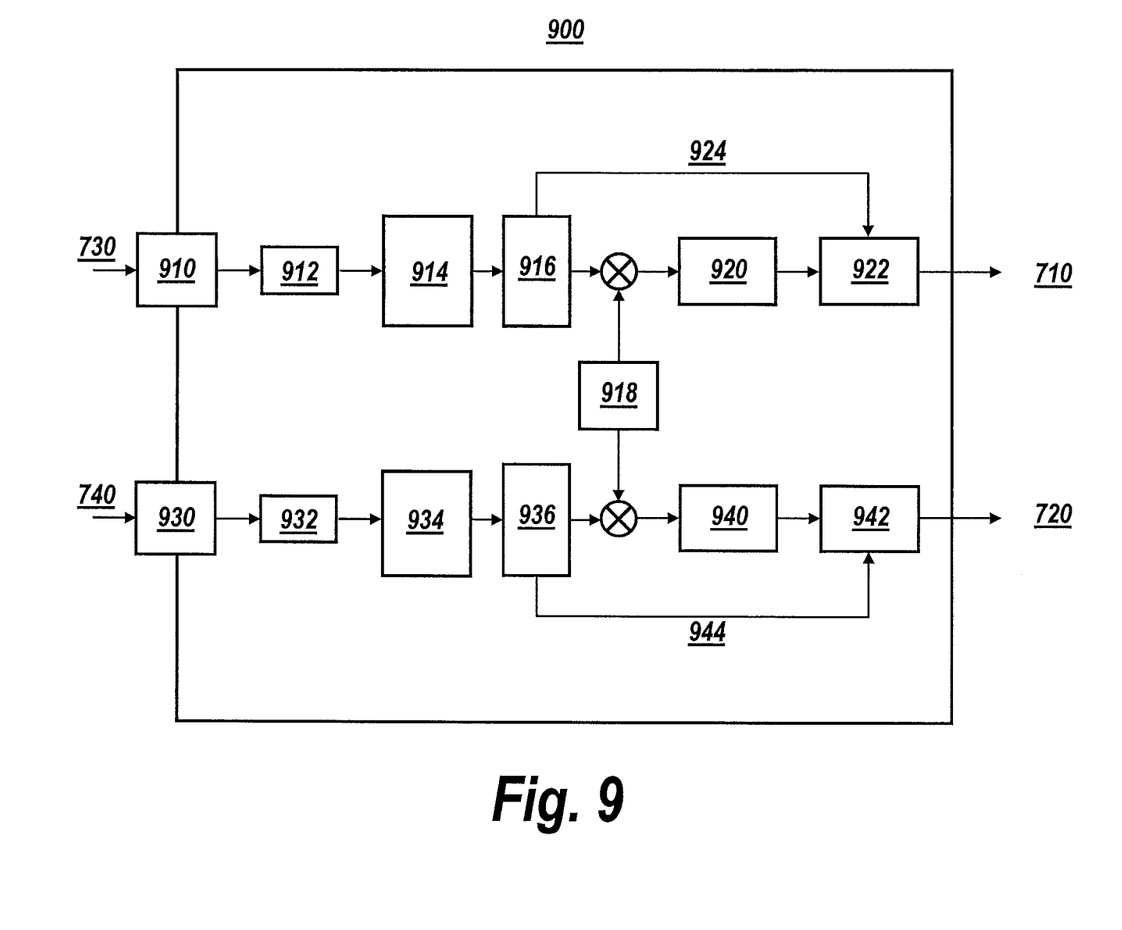
FIG. 9 is a block diagram representation of an exemplary alignment control apparatus 900 according to an exemplary embodiment of the present invention.

The output of the complimentary arm is forwarded to an alignment controller 900 (see FIG. 9). The alignment controller 900 determines a correction factor and adjusts the phase of the signal generated by the first interferometer 116 by applying a control voltage through a phase adjustor 710. Similarly, the second interferometer is provided with a second complimentary tap 740 and a second phase adjustor 720.

Although depicted as a part of the receiver in FIG. 7, the alignment controller 900 may or may not be provided integrally with the receiver. For example, the alignment controller 900 may be an external device which interacts with the receiver through a link. Alternatively, the alignment controller 900 may be integrated onto the same chip as the other components of the receiver, such as the pulse carver 112, the first and second interferometers 116, 119, the monitors 730, 740, and/or the light source 103. The alignment controller 900 may be embodied, for example, as a hardware device or computer, as software stored on a non-transitory electronic device readable storage medium, or as control logic.

The phase adjustors 710 and 720 may adjust the direction of a phase of the first data signal 712 and second data signal 722 based on a sign of the first signal error value. The first and second data signals 712, 722 may be, for example, electrically encoded signals that are encoded on the optical carrier by the first and second interferometers 116, 119. The phase adjustors 710, 720 may shift the phase of the data signals by applying a control voltage to a respective device that controls the phase of an electrical signal to be encoded onto an optical carrier by each of the interferometers 116, 119.

The components of the transmitter 102 of FIG. 7 may be formed integrally. For example, the components may be formed on the same substrate. The substrate may be an N+ substrate, such as n-InP, with the components formed thereon. Alternatively, the substrate may be a GaAs substrate, or any other suitable substrate.

As shown in FIG. 8A, in one example an integrally formed modulator may consist of an input, the pulse carver 112, the interferometers 116, 119, the monitors 730, 740 for monitoring a complimentary output, and a primary output for an output for transmitting a Differential m-ary Phase Shift Key (DmPSK) signal (such as a DQPSK signal) embodying the first data signal and the second data signal. In some embodiments, the light source 103 may also be provided integrally with the other components. The components may be integrated onto a single chip 800 or substrate.

Figure 8B:
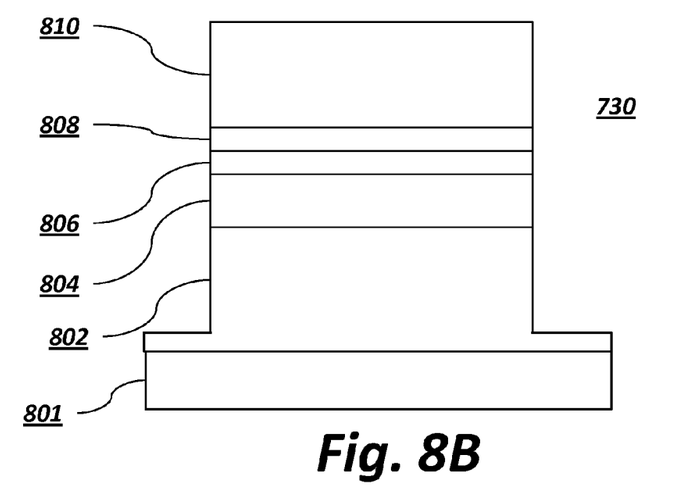
FIG. 8B depicts an exemplary integrated photodetector 730 for use with exemplary embodiments of the present invention.

FIG. 8B depicts an exemplary integrated photodetector 730 for use with exemplary embodiments of the present invention. The photodetector 730 is formed on a substrate 801, which may be InP. A second layer 802, which may be n+InP is formed on the substrate 801. A waveguide core 804 is provided on the second layer 802. The waveguide core 804 may be, for example i-InGaAsP. An absorber layer 806 may be formed on the waveguide core 804. The absorber layer 806 may include, for example, two layers: a first spacer layer facing the waveguide core 804 and an i-InGaAs layer facing a P+InP layer 808. A P+ InGaAs layer may cap the photodetector 730. This technique results in low bias, high responsivity, wavelength independent detectors.

The photodetectors 730, 740 may provide the output of the complimentary arm of the interferometers 116, 119 to an alignment controller 900, as shown in FIG. 9. As illustrated in FIG. 9, the alignment controller 900 receives at least a portion of the first complimentary signal from the tap 730 at a first input 910 and generates a correction factor for adjusting a phase of the first data signal. The first input 910 may be any type of input device suitable for receiving the output of the complimentary arm of the interferometer 116. The first data signal is forwarded to an analog to digital converter 912, which converts the signal into the digital domain.

A first alignment point processing module 914 accepts the converted digital signal and selects the above-described alignment points. Based on the alignment points, an error calculation module 916 calculates a first signal error value including a sign and a magnitude. The magnitude of the first signal error value may be forwarded to a multiplier, which multiplies the magnitude by the loop gain 918 in the feedback loop defined by the alignment controller 900. The multiplied value is forwarded to an accumulator 920.

Meanwhile, the sign 924 of the error value is forwarded to a correction factor determination module 922, which uses the sign 924 to determine a direction for a phase adjustment to be applied to the first interferometer 116. The output of the accumulator 920 is forwarded to the correction factor determination module 922, which uses the accumulator 920 output to determine the magnitude of the phase adjustment to be applied to the first interferometer 116. The direction and magnitude of the phase adjustment make up the correction factor which is forwarded to the phase adjustor 710, which applies the phase adjustment to the first data signal.

A similar structure is present for aligning a second data signal as received from the second tap 740. Specifically, a second input 930, a second analog-to-digital converter 932, a second alignment point processing module 934, a second error calculation module 936, a second accumulator 940, and a second correction factor determination module 942 are provided for processing the second signal. The second error calculation module 936 forwards a second sign 944 to the second correction factor determination module 942. The output of this second control loop is used to adjust the phase of the second data signal using the second phase adjustor 720.

In summary, it has been shown that when applying the concepts set forth herein of phase aligning optical signals based on a feedback loop and dither signal, one can significantly improve the performance of DPSK transmitters (both partial-DPSK and others). The same concept is applicable to mPSK and mQAM receivers with both direct detection and coherent detection schemes, and for NRZ and RZ cases. The same concept is also applicable to optical duo-binary format ODB (also known as phase-shaped binary transmission PSBT) and other direct-detection formats (on-off-keying, both RZ and NRZ).

The foregoing description may provide illustration and description of various embodiments of the invention, but is not intended to be exhaustive or to limit the invention to the precise form disclosed. Modifications and variations may be possible in light of the above teachings or may be acquired from practice of the invention. For example, while a series of acts has been described above, the order of the acts may be modified in other implementations consistent with the principles of the invention. Further, non-dependent acts may be performed in parallel. Moreover, although implementations have been described with particular emphasis on P-DQPSK, other modulation formats may also be employed.

In addition, one or more implementations consistent with principles of the invention may be implemented using one or more devices and/or configurations other than those illustrated in the Figures and described in the Specification without departing from the spirit of the invention. One or more devices and/or components may be added and/or removed from the implementations of the figures depending on specific deployments and/or applications. Also, one or more disclosed implementations may not be limited to a specific combination of hardware.

Furthermore, certain portions of the invention may be implemented as logic that may perform one or more functions. This logic may include hardware, such as hardwired logic, an application-specific integrated circuit, a field programmable gate array, a microprocessor, software, or a combination of hardware and software.

No element, act, or instruction used in the description of the invention should be construed critical or essential to the invention unless explicitly described as such. Also, as used herein, the article "a" is intended to include one or more items. Where only one item is intended, the term "a single" or similar language is used. Further, the phrase "based on," as used herein is intended to mean "based, at least in part, on" unless explicitly stated otherwise. In addition, the term "user", as used herein, is intended to be broadly interpreted to include, for example, a computing device (e.g., a workstation) or a user of a computing device, unless otherwise stated.

The scope of the invention is defined by the claims and their equivalents.

The invention claimed is:

1. A transmitter for aligning a first data signal with an alignment signal using feedback from the transmitter, the transmitter comprising:
   an alignment signal generator for generating an alignment signal;
   a first data signal generator for generating a first data signal, the first data signal generator comprising:
      a first arm for providing a primary signal, and
      a second arm for providing a complimentary signal;
   a monitor for receiving the first data signal, the monitor integrated into the second arm of the first data signal generator to receive the complimentary signal;
   an alignment controller for receiving at least a portion of the complimentary signal from the monitor and generating a correction factor for adjusting a phase of the first data signal, wherein the alignment controller includes:
      an alignment point processing module for selecting an alignment point in the complimentary signal and determining a first value of the complimentary signal that corresponds to the alignment point, and
      an error value determination module for digitally determining a first signal error value in the first data signal at the alignment point; and
   a phase adjustor for applying a phase adjustment to the first data signal to adjust a phase of the first data signal with respect to a phase of the alignment signal based on the determined first signal error value, wherein the monitor, the alignment controller, and the phase adjustor form a feedback loop that accepts the portion of the complimentary signal and adjusts the phase of the first data signal to generate an updated complimentary signal.

2. The transmitter of claim 1, wherein the alignment signal is a second data signal.

3. The transmitter of claim 1, wherein the monitor is a photodiode.

4. The transmitter of claim 1, wherein the phase adjustor adjusts the direction of a phase of the first data signal based on a sign of the first signal error value.

5. The transmitter of claim 1, further comprising a second data signal generator for generating a second data signal;
   wherein the alignment controller further receives at least a portion of a second complimentary signal relating to the second data signal and generates a correction factor for adjusting a phase of the second data signal;
   wherein adjusting the phase of the second data signal and applying the phase adjustment to the first data signal causes the second data signal and the first data signal to converge towards an aligned state.

6. The transmitter of claim 5, wherein the monitor is a first monitor and further comprising a second monitor coupled to the second data signal generator for measuring the second data signal, wherein the alignment controller interfaces with the first monitor and the second monitor.

7. The transmitter of claim 5, further comprising an output for transmitting a Differential Quadrature Phase Shift Key (DQPSK) signal embodying the first data signal and the second data signal.

8. The transmitter of claim 5, wherein the first data signal generator is a first interferometer and the second data signal generator is a second interferometer.

9. The transmitter of claim 8, wherein the first interferometer and second interferometer are Mach-Zender (MZ) interferometers.

10. The transmitter of claim 5, wherein the alignment controller further comprises one or more analog-to-digital converters (ADC) for converting the output of at least one of the first data signal generator and the second data signal generator to a corresponding digital input signal, the digital input signal being introduced to the alignment point processing module.

11. The transmitter of claim 5, further comprising one or more digital-to-analog converters (DAC) for converting the output of the alignment signal generator into an analog alignment input signal.

12. The transmitter of claim 1, wherein the error value determination module is configured to determine a difference between the first value of the complimentary signal and a second value of the complimentary signal that corresponds to a different alignment point.

13. The transmitter of claim 1, wherein the alignment controller is further configured to apply dither to the first data signal to cause an offset in the phase of the first data signal.

14. The transmitter of claim 1, wherein the alignment signal generator is a pulse carver.

15. A method for aligning a first data signal and an alignment signal using feedback from a transmitter comprising a modulator for generating the first data signal, the method comprising:
   generating the alignment signal with a pulse carver; and
   performing at least the following steps as part of a feedback loop:
      (a) receiving the alignment signal and the first data signal, the first data signal received at a monitor integrated into the modulator, the modulator comprising a first arm for providing a primary signal and a second arm for providing a complimentary signal, the monitor being integrated into the second arm to receive the complimentary signal;

(b) selecting one or more analysis points along the first data signal;

(c) digitally determining a correction factor representative of a difference in phase between the first data signal and the alignment signal at the analysis point; and (d) adjusting a phase of the first data signal with respect to a phase of the alignment signal based on the correction factor to converge the phase of the first data signal towards a phase of the alignment signal so as to generally align the signals.

16. The method of claim 15, further comprising the steps of
(e) receiving a second data signal;
(f) selecting one or more analysis points along the second data signal;
(g) determining a correction factor representative of a difference in phase between the second data signal and the alignment signal at the analysis point; and
(h) adjusting the phase of the second data signal based on the correction factor to converge the phase of the second data signal towards a phase of the alignment signal so as to generally align the signals.

17. The method of claim 16, further comprising repeating steps (e) through (h) until the second data signal is at least generally aligned with the alignment signal.

18. The method of claim 16, further comprising repeating steps (a) through (h) sequentially until the first and second data signals are at least generally aligned with the alignment signal.

19. The method of claim 16, wherein the optical communications network transmits a Differential Quadrature Phase Shift Key (DQPSK) signal embodying the first data signal and the second data signal.

20. The method of claim 15, wherein the step of determining the correction factor comprises
(d1) determining a first response of the complimentary signal at first point in time and determining a second response of the complimentary signal at a second point in time;
(d2) performing a mathematical operation on the first response and the second response to determine an error value; and
(d3) determining the correction factor based on the error value.

21. The method of claim 20, wherein the error value has a magnitude and a sign, and wherein the step (d3) of determining the correction factor comprises the steps of:
determining an amount of phase adjustment to be applied to the first data signal based on the magnitude of the error value;
determining a direction of phase adjustment to be applied to the first data signal based on the sign of the error value; and
determining the correction factor based on the amount and direction of the phase adjustment to the first data signal.

22. The method of claim 20, wherein the mathematical operation comprises a subtraction operation.

23. The method of claim 20, wherein the mathematical operation comprises calculating a derivative.

24. A method for aligning a first data signal and a second data signal using feedback from a transmitter comprising a first modulator for generating the first data signal and a second modulator for generating the second optical signal, the method comprising:

(a) receiving an alignment signal, the first data signal, and the second data the first data signal,
the first data signal received at a first monitor integrated into the first modulator, the first modulator comprising a first arm for providing a first primary signal and a second arm for providing a first complimentary signal, the first monitor being integrated into the second arm of the first modulator to receive the first complimentary signal,
the second data signal received at a second monitor integrated into the second modulator, the second modulator comprising a first arm for providing a second primary signal and a second arm for providing a second complimentary signal, the second monitor being integrated into the second arm of the second modulator to receive the second complimentary signal; and performing at least the following steps as part of a feedback loop:
(b) selecting an alignment point in the first data signal;
(c) digitally determining a first signal point in the first complimentary signal that corresponds to the alignment point;
(d) determining a first signal error value in the first complimentary signal at the first signal point; and
(e) applying a phase adjustment to the first data signal to adjust a phase of the first data signal with respect to a phase of the alignment signal based on the determined first signal error value.

25. The method of claim 24, wherein a sign of the first signal error value indicates the direction of the phase adjustment.

26. The method of claim 24, further comprising:
(f) determining a second signal point in the second data signal;
(g) determining a second signal error value in the second data signal at the second signal point; and
(h) applying a phase adjustment to the second data signal based on the determined second signal error value,
wherein applying the phase adjustment to the second data signal and applying the phase adjustment to the first data signal causes the second data signal and the first data signal to converge towards an aligned state.

27. The method of claim 26, wherein the aligned state is a state in which a local minimum of the first complimentary signal is aligned with a local minimum of the second complimentary signal.

28. The method of claim 26, further comprising repeating steps (b)-(h) sequentially until the first data signal and the second data signal converge to the aligned state.

29. The method of claim 26, wherein determining the first signal error value comprises determining a first value of the first complimentary signal at the first signal point and determining a second value of the first data signal at a point different from the first signal point, and determining a difference between the first value and the second value.

30. The method of claim 24, wherein the first signal error value relates to a derivative of the first complimentary signal.

31. The method of claim 24, wherein the first signal error value is determined to be less as the first point approaches a local minimum.

32. The method of claim 24, wherein determining the first signal error value comprises applying dither to the first data signal to cause an offset in the phase of the first data signal.

33. The method of claim 24, wherein the alignment signal is a pulse carved signal provided by a pulse carver.

34. The method of claim 24, wherein the optical communications network transmits a Differential Quadrature Phase Shift Key (DQPSK) signal comprising the first data signal and the second data signal.

* * * * *